UNITED STATES PATENT OFFICE.

MARIE T. LABBÉ, OF PARIS, FRANCE.

IMPROVEMENT IN DENTAL CEMENTS.

Specification forming part of Letters Patent No. 166,878, dated August 17, 1875; application filed May 20, 1875.

*To all whom it may concern:*

Be it known that I, MARIE THÉODORE LABBÉ, of Paris, France, have invented an Improved Composition or Cement for Dentistry, of which the following is a specification:

My improved composition or cement is employed in a plastic state, and when placed in or on the teeth rapidly attains a power of resistance equal to that of the hardest bodies. It is made of various shades in perfect imitation of the color of the teeth with which it has to form one and the same insoluble substance, and will deceive the keenest eye.

My composition comprises two special preparations, one of them solid and in pulverulent state, and the other a liquid, which agglutinates the powder at the time of its applications. The solid preparations may be made either of a grayish white or of a yellowish white.

I. *Formula for the solid preparation.*— For a grayish white color or shade I take oxide of zinc, black oxide of iron, and pure calcined silica, in the following proportions: Oxide of zinc, two thousand two hundred parts; oxide of iron, seven parts; pure calcined silica, one thousand parts. I triturate and pulverize these three substances carefully, and put them in a bottle or other vessel. For a yellowish white color or shade I take the same substances and add to them sixty parts of chromate of zinc finely pulverized and sifted.

II. *Formula for the liquid preparation.*— The liquid preparations, which is for agglutinating the solid preparations, is composed of chloride of zinc and hydrochloric acid, in the proportions of thirty-nine parts of chloride to seventy parts of the acid. I mix these two substances, and when the reaction is finished I boil the liquid mixture in the presence of an excess of zinc and oxide of zinc. I thus obtain a milky-white liquid, streaked with yellow, due to the precipitation of the iron, and I stop the boiling when the liquid marks from 49° to 90° Baumé. I allow it to settle and draw it clear by filtering. I then put it in a bottle or other vessel.

Having thus obtained the two preparations, from which my dental composition or cement is made, I employ them as follows: I take a pinch or small quantity of the solid preparation, or powder of one of the first formulæ given, and agglutinate it with a sufficient quantity of the liquid preparation, thus forming a paste, which is applied to the tooth to be stopped. This paste, which has the property of hardening quickly, like hydraulic cement, becomes united or consolidated with the tooth, forming with it one and the same insoluble body.

This cement or composition has the great advantage over metals amalgamated with mercury, that it is harmless, and it is superior to cements and powders hitherto used as stopping for teeth by its hardness and its exact imitation to the colors or shades of the teeth. The proportions before given may be varied as required.

I claim—

The herein-described dental cement, consisting of oxide of zinc, oxide of iron, calcined silica, in the proportions substantially as specified, combined with the agglutinating compound, consisting of chloride of zinc and hydrochloric acid, in the proportions and prepared substantially as described.

In testimony whereof I have signed my name to this specification before two subscribing witnesses.

M. T. LABBÉ.

Witnesses:
ROBT. M. HOOPER,
ARMENGAUD, Jeune.